2,827,488
TRANSAMINATION

Marian F. Fegley, Mont Clare, and Newman M. Bortnick, Oreland, Pa., assignors to Rohm & Haas Company, Philadelphia, Pa., a corporation of Delaware No Drawing. Application October 5, 1955
Serial No. 538,780

5 Claims. (Cl. 260—583)

This invention concerns a process for transaminating 1,4-bis(tert-amino)-1,3-butadiene with a secondary amine having N-substituents different from those of the bisaminobutadiene in the presence of an acidic catalyst.

It has been shown in our application Serial No. 316,558, filed October 23, 1952, now United States Patent No. 2,752,343, that bis(tert-amino)-1,3-butadienes may be prepared from corresponding bisamino-2-butynes by treating a bisamino-2-butyne with lithium, sodium, or a sodium hydrocarbon. We also showed in this earlier filed specification of which the present application is a continuation-in-part that the bis(tert-amino)-1,3-butadienes may be transaminated. Thus, with a bis-amino-1,3-butadiene at hand having simple N-alkyl groups, such as methyl or ethyl, there may be prepared a great variety of other bis(tert-amino)-1,3-butadienes with larger or more complex N-substituents. Since the diaminobutadienes are most conveniently prepared from dimethylamine or diethylamine, an aldehyde, and acetylene, the conversion of these readily attainable compounds to more complex or higher molecular weight products by transamination provides an expedient way to reach the latter. Furthermore, the process of this invention provides a method of going from cis, trans isomers to trans,trans isomers.

As useful starting materials there may be used 1,4-bis-(dimethylamino)-1,3-butadiene or 1,4-bis(diethylamino)-1,3-butadiene. While higher bis(dialkylamino)butadienes may be used, there is less advantage in so doing and this also holds true for more complex substances such as dimorpholinobutadiene. There are also advantageously used 1,4-bis(alkylamino)-1,3-butadienes having hydrocarbon substituents in the 1- and/or 4-positions, such as methyl, isopropyl, octyl, phenyl, and the like, these being provided from the residue of the aldehyde used to prepare the diamino-2-butyne. But one of these positions may be thus substituted or both may be so substituted. These substituents may be the same or they may be different.

As secondary amines there may be used any amine having an ionization constant greater than $10^{-8}$. Useful secondary amines include diethylamine, dipropylamine, dibutylamine, dihexylamine, di-2-ethylhexylamine, dioctylamine, didodecylamine, diallylamine, didodecenylamine, dicetylamine, dioctadecylamine, diundecenylamine, dicyclohexylamine, dibenzylamine, N-benzyl-N-methylamine, N-dodecyl-N-methylamine, N-butyl-N-methylamine, N-cyclohexyl-N-methylamine, morpholine, dimethylmorpholine, pyrrolidine, piperidine, N-methylpiperazine, and various substituted amines having sufficient base strength such as N-vinyloxyethyl-N-methylamine, bis(dimethylaminopropyl)amine, and the like.

As catalysts for reacting a secondary amine and a bis(tert-amino)-1,3-butadiene there is used an acidic catalyst. While strong acids can be used to give rapid reaction, and are, therefore, usually preferred, the weak acids are also catalytically effective. Even a compound as weakly acidic as phenol can be used, although the catalysts generally used give a dissociation constant of about $10^{-5}$ or more. Thus, there may be used a small amount of a carboxylic acid, particularly of a saturated aliphatic monocarboxylic acid of not over four carbon atoms, these being formic, acetic, propionic, and butyric. On the other hand an inorganic acid such at sulfuric, hydrochloric, hydrobromic, hydriodic, phosphoric, or polyphosphoric may be used. Also highly effective are the sulfonic acids, including both alkanesulfonic acids and arylsulfonic acids. Typical of these are benzenesulfonic, chlorobenzenesulfonic, o-, or p-toluenesulfonic, 2,4-, 3-4-, or 3,5-dimethylbenzenesulfonic, butylbenzenesulfonic, α- or β-naphthalenesulfonic, 1,5- or 2,6-naphthalenedisulfonic, 4-methylnaphthalene-1-sulfonic, or 4-methylnaphthalene-2-sulfonic acids; the various anthracenesulfonic or phenanthrensulfonic acids, pyrene-3-sulfonic, chrysene-1-sulfonic, methanesulfonic, ethanesulfonic, propanesulfonic, butanesulfonic, octanesulfonic, dodecanesulfonic, and octadecanesulfonic acids. Individual acids may be used or mixtures, including the commercial mixtures of alkanesulfonic acids, as from methane- to propane- or butanesulfonic acids or mixtures of the toluene- or xylenesulfonic acids. Sulfonic acids of these types contain preferably not over twelve carbon atoms.

There may also be considered as part of the class of sulfonic acids the sulfonated coals and sulfonated ion exchange resins in hydrogen form. These have the same action as soluble sulfonates although they are insoluble. The sulfonated cross-linked polystyrenes and phenol-formaldehyde resins are well known. These are in fact a kind of arylsulfonic acid.

A very valuable group of catalysts consists of the boron fluoride catalysts, which are chiefly the coordination complexes of boron trifluoride and oxygenated compounds. These are well known. They act as rather strongly acidic agents. These complexes include those formed with water and oxygenated organic compounds, including alcohols, phenols, ethers, ketones, aldehydes, carboxylic acids and their anhydrides, esters, and amides. Usually the preferred complexes are formed with boron trifluoride and an oxygenated compound of not over twelve carbon atoms.

Typical complexes are formed with boron trifluoride and an ether such as methyl, ethyl, isopropyl, or butyl ether, anisole, phenetole, benzyl methyl ether, or cyclohexyl methyl ether, $BF_3 \cdot R'OR''$, where $R'$ and $R''$ are hydrocarbon groups, preferably of not over eight carbon atoms in $R'$ or $R''$. Complexes with cyclic ethers are also useful, such as $BF_3 \cdot O(CH_2CH_2)_2O$, $BF_3 \cdot (CH_2)_4O$, or $BF_3 \cdot (CH_2)_5O$.

Coordination complexes of carboxylic acids, also their anhydrides are very effective as catalysts since they include a carboxylic portion which tends to be catalytically active in its own right. Some typical boron trifluoride complexes are those formed with acetic acid, propionic acid, butyric acid, caprylic acid, oxalic acid, maleic acid, salicylic acid, hexahydrobenzoic acid, and succinic acid. Anhydrides of these and boron trifluoride also provide effective catalysts.

Phenols provide yet another class of coordination complexes with boron trifluoride. Typical phenols which may be thus used include phenol itself, the various cresols and xylenols, chlorophenol, hydroquinone, resorcinol, catechol, pyrogallol, or phloroglucinol. The complex with gallic acid may also be listed here.

Complexes can also be formed with such alcohols as ethanol, propanol, butanol, tert-butanol, or ketones such as acetone, methyl ethyl ketone, or methyl hexyl ketone, or aldehydes such as butyraldehyde, benzaldehyde, salicylaldehyde, or anisaldehyde, or esters such as the alkyl alkanoates including methyl, ethyl, or butyl formate, acetate, propionate, or butyrate, methyl or ethyl glycolate, ethyl lactate, methyl benzoate, methyl salicylate, dimethyl or diethyl oxalate, malonate, or succinate, or a carboxylic amide such as dimethylformamide, acetanilide, acetamide, or an amide of other alkanoic acid, particularly up to lauric acid.

Friedel-Crafts catalysts and other aprotic acids are also useful in the process of this invention. There may be used a polyvalent metal halide such as aluminum chloride, aluminum bromide, aluminum iodide, ferric chloride, ferric bromide, stannic chloride, titanium tetrachloride, zinc chloride, and similar reagents. There may also be used nitrosyl chloride, nitric oxides, sulfur dioxide, sulfur trioxide, phosphorus trichloride or pentachloride, $POCl_3$, $PSCl_3$, $SO_2.BF_3$, $SOF_2.BF_3$, $SOCl_2$, or $SO_2Cl_2$.

The reaction is effected by mixing a bis(tert-amino)-1,3-butadiene and a secondary amine and adding from about 0.1 to 5 mole percent of an acidic catalyst. In some cases reaction begins to occur even below 20° C. but is slow. Hence, heating is desirable and temperatures up to about 150° C. have been tried. A range of 50° to 100° C. is preferred. An inert gas may be supplied, such as nitrogen, and used to help sweep out the displaced amine. The reaction may, if desired, be done under reduced pressure. If the displaced amine is absorbed, it provides a measure of the progress of the reaction. When the reaction has progressed, the catalyst is destroyed with an alkaline reagent before the product is isolated. The displaced amine need not, however, be taken off or removed from the reaction mixture. An alternate way of proceeding is to mix bis(tert-amino)-1,3-butadiene and excess of secondary amine, supply an acidic catalyst, and carry the reaction toward equilibrium. The acidic catalyst is then destroyed, thus freezing the equilibrium. This is done by adding an alkaline reagent such as sodium or potassium hydroxide or carbonate. The reaction mixture is then resolved and the reaction product is separated by distillation, crystallization, extraction, or other conventional procedure.

The products are of interest as stabilizers and corrosion inhibitors. But of more importance is their utility as valuable chemical intermediates. They react with alcohols, mercaptans, hydrogen cyanide, and other reactive substances to provide an array of new chemical compounds. Of especial interest is the reaction of the transaminated products with unsaturated compounds such as acrylic esters, acrylonitrile, acrolein, allyl chloride, and other vinyl and allyl compounds which serve as dienophiles. Reaction may also be had with maleic compounds, fumaric compounds, or acetylenic dienophiles.

The following illustrative examples present additional details. Parts shown therein are by weight.

Example 1

There were charged to a reaction vessel equipped with stirrer, thermometer, gas inlet, and a gas outlet attached to a scrubber containing dilute hydrochloric acid 35 parts of 1,4-bis(dimethylamino)-1,3-butadiene and 60 parts of morpholine. The system was flushed with nitrogen, the stirrer was started, and addition was made of 0.3 part of glacial acetic acid and 0.15 part of hydrochloric acid. A slow flow of nitrogen helped carry liberated dimethylamine into the scrubber. About three hours after the reaction was started, the reaction mixture was warmed to 66° C. During the next hour considerable solid material separated. Some pentane was added to facilitate stirring. Heating was discontinued, but stirring and flow of gas were continued for 1.25 hours, at which time the theoretical quantity of amine had been collected in the scrubber. The solid product was separated by filtering and washed with pentane. When dried, it amounted to 50 parts and corresponded in composition to 1,4-bismorpholino-1,3-butadiene. As obtained, it melted at 117°–121° C. After recrystallization a melting point of 138°– 139.5° C. was found. The product as obtained is the trans,trans isomer.

Replacement of the above bis(dimethylamino)butadiene with 1,4-bis(diethylamino)-1,3-butadiene in equivalent amount lead to the identical product. Replacement of the hydrochloric acid catalyst with other strong inorganic acid, such as sulfuric, phosphoric, polyphosphoric, hydrobromic or hydriodic gives the same reaction and leads to the same product. Likewise, toluene-sulfonic acid, naphthalenesulfonic acid, or an acidic sulfonated cation exchange resin all led to the identical end product.

Example 2

There were charged to the reaction vessel 35 parts of bis(dimethylamino)butadiene, 75 parts of dibutylamine, 0.3 part of glacial acetic acid, and 0.15 part of concentrated hydrochloric acid. The reaction mixture was stirred, heated to about 54° C., and maintained under a pressure of 60–70 mm. for 7.5 hours. The reaction mixture was allowed to stand for a time and then treated with potassium carbonate. The reaction mixture was fractionally distilled at reduced pressure. After removal of dibutylamine the product began to come over. About 38 parts of product was collected at 145°–157° C./0.3–0.4 mm. This had a refractive index, $n_D^{24}$, of 1.5082 and corresponded in composition to 1,4-bis(dibutylamino)-1,3-butadiene.

Repetition of this procedure with use of sulfuric or phosphoric acid as catalyst leads to the identical product. Use of a sulfonic acid, whether an alkanesulfonic acid or an arylsulfonic acid, is also very satisfactory in catalyzing the above reaction or any of the reactions of this invention.

Example 3

The reaction vessel was charged with 72 parts of pyrrolidine, 52 parts of 1,4-bis(dimethylamino)-1,3-butadiene, 0.1 part of hydrochloric acid, and 0.3 part of acetic acid. The stirred mixture was maintained at 40°–50° C. for three hours, while the system was flushed with a gentle stream of nitrogen. The theoretical amount of dimethylamine was liberated. The reaction mixture was cooled in an ice-bath with formation of a solid which was filtered off and rinsed with ether. Additional solid separated in the filtrate on further cooling. The product, after recrystallization from 90°–100° C. petroleum ether, melted at 94°–97° C. It was found to contain 14.43% of nitrogen and was identified as 1,4-dipyrrolidino-1,3-butadiene. The theoretical nitrogen content of this compound is 14.56%.

In place of bis(dimethylamino)butadiene there may be used 1,4-bis(diethylamino)-1,3-butadiene. The reaction is the same, except that diethylamine is liberated. The same end-product is obtained in similar yield.

In place of pyrrolidine there may be used with like effect piperidine, morpholine, N-methylpiperazine, or other heterocyclic secondary amine. In each case transamination occurs. Likewise, the same end-products are obtained when different acid catalysts are used in place of the above mixture of acids, including other inorganic acids, any of the sulfonic acids, the carboxylic acids giving at least a pH of 5, the boron trifluoride coordination complexes of carboxylic acids, alcohols, ethers, aldehydes or ethers, or a Friedel-Crafts catalyst.

Example 4

The reaction vessel was charged with 150 parts of di(2-ethylhexyl)amine, 35 parts of 1,4-bis(dimethylamino)-1,3-butadiene, 0.15 part of hydrochloric acid, and 0.3 part of acetic acid. The stirred mixture was heated and maintained at 60±5° C. for six hours. During the reaction period the system was maintained under a water pump vacuum of approximately 30 to 50 mm. This facilitated the removal of dimethylamine as it was liberated. The acid catalysts were neutralized by the addition of 0.5 part of potassium hydroxide. The mixture was then fractionally distilled. The product which distilled at 171°–180° C./3 mm. corresponded on analysis to 1,4-bis[di(2-ethylhexyl)amino]-1,3-butadiene. The refractive index of this material, $n_D^{20}$, is 1.4812.

During the fractionation of the reaction mixture there is also obtained some 1-dimethylamino-4-[di(2-ethylhexyl)amino]-1,3-butadiene.

Example 5

A mixture of 101 parts of diallylamine, 56 parts of 1,4-bis(dimethylamino)-1,3-butadiene, 0.15 part of hydrochloric acid, and 0.3 part of acetic acid was charged to the reaction vessel. The material was stirred and maintained at 50° to 60° C. for fourteen hours. During this time 36 parts of dimethylamine was swept from the flask with a gentle stream of nitrogen. The material was washed with 50 parts of a 20% aqueous solution of potassium hydroxide, dried over potassium carbonate, and distilled to give a main fraction of 30 parts of 1,4-bis-(diallylamino)-1,3-butadiene. This product had a refractive index, $n_D^{20}$, of 1.5501.

Other dialkenylamines can be used in the same way to give in each case the corresponding bis(dialkenylamino)-1,3-butadiene. In place of 1,4-bis(dimethylamino)-1,3-butadiene there may be used butadiene having 1- and/or 4- alkyl, alkenyl, aryl, or cycloalkyl substituents. In these procedures there may be used with like outcome any other of the acidic catalysts such as described herein. Particularly interesting are the coordination catalysts of boron trifluoride for clean-cut catalysts of the reaction, although an inorganic acid or a sulfonic acid are usually the most economical.

Example 6

A reaction vessel was charged with 102 parts of β-methylaminoethyl vinyl ether, 56 parts of 1,4-bis(dimethylamino)-1,3-butadiene, 0.15 part of hydrochloric acid, and 0.3 part of acetic acid. The stirred mixture was maintained at 46° C. for eight hours. During this time 34 parts of dimethylamine was flushed from the reaction vessel by a gentle stream of nitrogen. The mixture was washed with water and dried over potassium carbonate. The dried material was fractionally distilled in the presence of 0.5 part of potassium hydroxide to give 33 parts of a product which came over at 150°–157° C./.10 mm. This material was found to contain 11.14% nitrogen. It corresponded to 1,4-di(N-β-vinoxyethyl-N-methylamino)-1,3-butadiene. The theoretical value for this compound is 11.10% nitrogen. The product had a refractive index, $n_D^{20}$, of 1.5400.

The above procedure was followed with substitution of naphthalenesulfonic acid for the above hydrochloric acetic acid mixture. The same product was obtained.

Example 7

The reaction vessel was charged with 110 parts of diethylamine, 70 parts of 1,4-bis(dimethylamino)-1,3-butadiene, 0.30 part of acetic acid, and 0.15 part of hydrochloric acid. The mixture was maintained at 50°–60° C. for 16 hours. The acid was neutralized by the addition of 0.5 part of potassium hydroxide. On fractional distillation 1,4-bis(diethylamino)-1,3-butadiene was separated at 97° to 125° C./1.6 mm. The refractive index of this product, $n_D^{20}$, is 1.5423.

Replacement of the above acid catalysts with sulfuric acid, toluenesulfonic acid, naphthalenesulfonic acids, phosphoric acid, a sulfonated cross-linked styrene-divinyl benzene cation-exchange resin in hydrogen form, sulfonated coal in hydrogen form, boron trifluoride-ethyl ether complexes, boron trifluoride-acetic acid complexes, or aluminum chloride led to the identical reaction product.

Example 8

A reaction vessel was charged with 65 parts of dibenzylamine, 22 parts of 1,4-bis(dimethylamino)-1,3-butadiene, 0.15 part of hydrochloric acid, and 0.25 part of acetic acid. The mixture was stirred and maintained at 50°–55° C. for two hours. At the end of this time the reaction mixture was quite viscous. Approximately 60 parts of pentane was added and the stirring continued for eight hours. The reaction mixture was filtered and the residue was rinsed with pentane. After recrystallization from petroleum ether distilling at 90°–100° C. and dioxane the solid melted at 136°–137.5° C. On analysis the solid was found to contain 6.43% nitrogen. It was identified as 1,4-bis(dibenzylamino)-1,3-butadiene. The theoretical value for this compound is 6.30% of nitrogen.

In place of the above acid catalysts there may be used with like outcome any of the saturated monocarboxylic acids of not over four carbon atoms, strong inorganic acids, arylsulfonic acids, alkanesulfonic acids, boron trifluoride catalysts, or Friedel-Crafts catalysts.

Example 9

A mixture of one part of morpholine, 2 parts of 1,4-di(2',4',4' - trimethylpentyl) - 1,4 - bis(dimethylamino)-1,3-butadiene, 0.05 part of hydrochloric acid, and 0.05 part of acetic acid was prepared. A slow stream of nitrogen was bubbled through the mixture for 48 hours. The reaction mixture was fractionally distilled at 151°–158° C./0.17 mm. A main fraction was obtained which corresponded in composition to 1,4-dimorpholino-1,4-di-(2',4',4'-trimethylpentyl)-1,3-butadiene.

Repetition of this procedure with substitution of 0.05 part of the boron trifluoride ethyl ether complex, the boron trifluoride-butyl ether complex, a boron trifluoride-acetic acid complex, or a boron trifluoride-acetone complex leads to the same end-product. A sulfonic acid, such as chlorobenzenesulfonic, xylenesulfonic, or naphthalenesulfonic is also very effective as catalyst and leads to the same end-product. In the same way an aprotic acid may be used, such as $SO_2Cl_2$ or $SOCl_2$ or $SO_2$ with resulting transamination. Friedel-Crafts catalysts are also very effective.

It is thus evident that this transamination reaction may be extended to all 1,4-bis(compounds) of the type

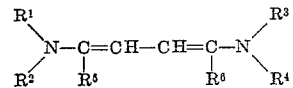

in which $R^1$, $R^2$, $R^3$, and $R^4$ are methyl or ethyl and $R^5$ and $R^6$ are members of the class consisting of hydrogen, alkyl groups of not over eight carbon atoms, benzyl, and phenyl groups.

This application is also a continuation-in-part of application Serial No. 373,754, now abandoned.

We claim:

1. A process for transaminating a 1,4-bis(dialkylamino)-1,3-butadiene which comprises reacting together in liquid phase in the presence of an acidic catalyst from the class consisting of saturated monocarboxylic acids of not over four carbon atoms, strong inorganic acids, arylsulfonic acids, alkanesulfonic acids, boron trifluoride catalysts formed from boron trifluoride and water, alcohols, phenols, aldehydes, ketones, ethers, carboxylic acids, and their anhydrides, esters, and amides with not over twelve carbon atoms, and Friedel-Crafts catalysts with a said butadiene having N-alkyl substituents of not over two carbon atoms and a secondary amine having an ionization constant greater than $10^{-8}$ and having N-substituents different from those of the butadiene.

2. A process for transaminating a 1,4-bis(dimethylamino)-1,3-butadiene which comprises reacting together in liquid phase in the presence of an acidic catalyst from the class consisting of saturated monocarboxylic acids of not over four carbon atoms, strong inorganic acids, arylsulfonic acids, alkanesulfonic acids, boron trifluoride catalysts formed from boron trifluoride and water, alcohols, phenols, aldehydes, ketones, ethers, carboxylic acids, and their anhydrides, esters, and amides with not over twelve carbon atoms, and Friedel-Crafts catalysts the butadiene and a secondary amine having N-substituents other than two methyl groups and having a dissociation constant greater than $10^{-8}$.

3. A process for transaminating a 1,4-bis(dimethylamino)-1,3-butadiene which comprises reacting together in liquid phase in the presence of an acidic catalyst from the class consisting of saturated monocarboxylic acids of not over four carbon atoms, strong inorganic acids, arylsulfonic acids, alkanesulfonic acids, boron trifluoride catalysts formed from boron trifluoride and water, alcohols, phenols, aldehydes, ketones, ethers, carboxylic acids and their anhydrides, esters, and amides with not over twelve carbon atoms, and Friedel-Crafts catalysts the butadiene and a secondary amine having an amine residue other than the dimethylamine group and having a dissociation constant greater than $10^{-8}$, destroying the acidic catalyst, and separating the transaminated butadiene.

4. A process for transaminating a 1,4-bis(dimethylamino)-1,3-butadiene which comprises reacting together in liquid phase in the presence of an acidic catalyst from the class consisting of saturated monocarboxylic acids of not over four carbon atoms, strong inorganic acids, arylsulfonic acids, alkanesulfonic acids, boron trifluoride catalysts formed from boron trifluoride and water, alcohols, phenols, aldehydes, ketones, ethers, carboxylic acids and their anhydrides, esters, and amides with not over twelve carbon atoms, and Friedel-Crafts catalysts the butadiene and a dialkylamine containing more than two carbon atoms, destroying the catalyst, and separating the transaminated butadiene.

5. A process for transaminating a 1,4-bis(dimethylamino)-1,3-butadiene which comprises reacting together in liquid phase in the presence of an acidic catalyst from the class consisting of saturated monocarboxylic acids of not over four carbon atoms, strong inorganic acids, arylsulfonic acids, alkanesulfonic acids, boron trifluoride catalysts formed from boron trifluoride and water, alcohols, phenols, aldehydes, ketones, ethers, carboxylic acids and their anhydrides, esters, and amides with not over twelve carbon atoms, and Friedel-Crafts catalysts the 1,4-bis(dimethylamino)-1,3-butadiene and a heterocyclic secondary amine having a dissociation constant greater than $10^{-8}$, destroying said catalyst with a strong base, and separating the transaminated butadiene, said heterocyclic secondary amine having two valences of the amino nitrogen satisfied with a divalent chain from the class consisting of the $-CH_2CH_2OCH_2CH_2-$, $-CH_2CH_2CH_2CH_2-$, $-CH_2CH_2CH_2CH_2CH_2-$ and $-CH_2CH_2N(CH_3)CH_2CH_2-$ groups.

No references cited.